US010508417B2

(12) United States Patent
Hasegawa et al.

(10) Patent No.: US 10,508,417 B2
(45) Date of Patent: Dec. 17, 2019

(54) CONSTRUCTION INFORMATION DISPLAY DEVICE AND METHOD FOR DISPLAYING CONSTRUCTION INFORMATION

(71) Applicant: Komatsu Ltd., Tokyo (JP)

(72) Inventors: Ryohei Hasegawa, Hiratsuka (JP); Kenji Ohiwa, Hirakata (JP); Satoru Shintani, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/027,305

(22) PCT Filed: Dec. 18, 2015

(86) PCT No.: PCT/JP2015/085581
§ 371 (c)(1),
(2) Date: Apr. 5, 2016

(87) PCT Pub. No.: WO2016/111148
PCT Pub. Date: Jul. 14, 2016

(65) Prior Publication Data
US 2017/0175364 A1 Jun. 22, 2017

(51) Int. Cl.
*E02F 9/26* (2006.01)
*B60R 16/023* (2006.01)
(Continued)

(52) U.S. Cl.
CPC .......... *E02F 9/261* (2013.01); *B60R 16/0231* (2013.01); *E02F 3/32* (2013.01); *E02F 3/435* (2013.01); *E02F 9/22* (2013.01); *E02F 9/265* (2013.01); *G06T 11/00* (2013.01); *G06T 11/40* (2013.01); *E02F 9/205* (2013.01); *G06F 3/04842* (2013.01); *G06T 2210/62* (2013.01)

(58) Field of Classification Search
CPC ....................................................... E02F 9/261
See application file for complete search history.

(56) References Cited

U.S. PATENT DOCUMENTS 6,928,384 B2 * 8/2005 Kochi ................ H04N 13/0059
348/E13.008
9,043,098 B2 5/2015 Nomura et al.
(Continued)

FOREIGN PATENT DOCUMENTS

CN 103764919 A 4/2014
CN 103827943 A 5/2014
(Continued)

OTHER PUBLICATIONS

International Search Report and Written Opinion dated Mar. 15, 2016, issued for PCT/JP2015/085581.

*Primary Examiner* — Samantha (Yuehan) Wang
(74) *Attorney, Agent, or Firm* — Locke Lord LLP

(57) ABSTRACT

A construction information display device configured to display construction information includes: a display unit configured to display at least a partial distribution map indicating a current landform and a design landform; an input unit through which a target surface is selected from the design landform; and a display processing unit configured to, when the target surface is selected through the input unit, display a range of the selected target surface while visibly displaying the partial distribution map within the selected target surface.

13 Claims, 10 Drawing Sheets

(51) Int. Cl.
*G06T 11/40* (2006.01)
*E02F 3/32* (2006.01)
*E02F 9/22* (2006.01)
*E02F 3/43* (2006.01)
*G06T 11/00* (2006.01)
G06F 3/0484 (2013.01)
E02F 9/20 (2006.01)

(56) References Cited

U.S. PATENT DOCUMENTS

| | | | |
|---|---|---|---|
| 9,333,915 B2 | 5/2016 | Nakanishi et al. | |
| 9,582,857 B1* | 2/2017 | Kolesinski | G06T 5/00 |
| 10,017,919 B2 | 7/2018 | Nomura et al. | |
| 2003/0004645 A1 | 1/2003 | Kochi | |
| 2013/0311153 A1* | 11/2013 | Moughler | G06Q 10/047 |
| | | | 703/6 |
| 2014/0100712 A1* | 4/2014 | Nomura | E02F 3/32 |
| | | | 701/1 |
| 2014/0214253 A1 | 7/2014 | Inoue et al. | |
| 2014/0267731 A1* | 9/2014 | Izumikawa | B60R 1/00 |
| | | | 348/148 |
| 2015/0183370 A1 | 7/2015 | Nakanishi et al. | |
| 2016/0024757 A1 | 1/2016 | Nomura et al. | |
| 2016/0083932 A1 | 3/2016 | Inoue et al. | |

FOREIGN PATENT DOCUMENTS

| | | |
|---|---|---|
| CN | 103857852 A | 6/2014 |
| CN | 103958790 A | 7/2014 |
| DE | 112013000115 T5 | 1/2015 |
| JP | 10-091059 A | 4/1998 |
| JP | 2002-352224 A | 12/2002 |
| JP | 2003-239287 A | 8/2003 |
| JP | 2006-214246 A | 8/2006 |
| JP | 2013-036243 A | 2/2013 |
| JP | 2014-055407 A | 3/2014 |
| JP | 2014-074315 A | 4/2014 |
| JP | 2014-205955 A | 10/2014 |
| KR | 10-2014-0088043 A | 7/2014 |

* cited by examiner

CONSTRUCTION INFORMATION DISPLAY DEVICE AND METHOD FOR DISPLAYING CONSTRUCTION INFORMATION

FIELD

The present invention relates to a construction information display device and a method for displaying construction information that make it possible to visually recognize a target surface serving as a region to be constructed and a current landform relative to this target surface such as a condition of a current landform before construction or a condition of a current landform after construction (construction result).

BACKGROUND

Recently, an excavator, a bulldozer, or another working machine has been proposed such as one equipped with a global positioning system (GPS) or the like with which the working machine detects a position thereof for itself and compares that positional information with construction information indicating a landform of a construction site to obtain an attitude of a working instrument through computational processing such that the movement of the working instrument is controlled or a construction condition is displayed on a monitor device as a guidance by examining an attitude or a position of the working instrument relative to the construction information (refer to Patent Literature 1). Construction using such a working machine is referred to as computer-aided construction. By using the computer-aided construction, even an operator not skilled in operating the working machine can realize highly accurate construction. For a skilled operator, the computer-aided construction enables highly efficient construction. The computer-aided construction can considerably reduce surveying operation and finishing stake operation that have been required in the past.

CITATION LIST

Patent Literature

Patent Literature 1: Japanese Laid-open Patent Publication No. 2014-205955

SUMMARY

Technical Problem

When a distribution map indicating, for example, a difference in height of a landform is displayed on the aforementioned monitor device for a region to be constructed, a condition of a current landform can be visually recognized.

Meanwhile, a landform after the completion of construction (design landform) is displayed as a polygonal image using a plurality of design surfaces. When an operator starts construction, in some cases, the operator selects a target surface to be constructed from one or more design surfaces to display an image indicating a range of that target surface on a display device. The target surface is a surface indicating a landform after the completion of construction in a construction region for a specific case. However, in a case where the image indicating the range of the selected target surface overlaps a distribution map indicating a condition of a current landform before construction or a condition of a current landform after construction (construction result) corresponding to the selected target surface, the operator of a working machine is not able to visually recognize the distribution map. In this case, it is difficult for the operator of the working machine to, for example, understand a difference between the condition of the current landform and the target surface, understand a difference between the target surface and a construction result until a specific time point, or examine a construction procedure for the region of the target surface.

The present invention has been made taking the above-mentioned problem into consideration and an object of the invention is to provide a construction information display device and a method for displaying construction information that make it possible to visually recognize a target surface serving as a region to be constructed and a current landform relative to this target surface such as a condition of a current landform before construction or a condition of a current landform after construction (construction result).

Solution to Problem

To solve the problem and achieve the object, a construction information display device configured to display construction information according to the present invention includes: a display unit configured to display at least a partial distribution map indicating a current landform and a design landform; an input unit through which a target surface is selected from the design landform; and a display processing unit configured to, when the target surface is selected through the input unit, display a range of the selected target surface while visibly displaying the partial distribution map within the selected target surface.

Moreover, in the construction information display device according to the present invention, the display processing unit semi-transparently displays the selected target surface.

Moreover, in the construction information display device according to the present invention, the display processing unit displays the range of the target surface by applying a predetermined pattern to the inside of the selected target surface and visibly displays the partial distribution map.

Moreover, in the construction information display device according to the present invention, the display processing unit displays the range of the target surface by using a frame line of the selected target surface.

Moreover, in the construction information display device according to the present invention, further includes: a setting unit configured to set an assistance region that assists construction for the selected target surface so as to be displayed around the target surface, wherein in a case where the assistance region is set, by the setting unit, to be displayed on the display unit together with the target surface, the display processing unit displays a range of the assistance region in addition to the range of the selected target surface and visibly displays the partial distribution map within the assistance region.

Moreover, in the construction information display device according to the present invention, the display processing unit semi-transparently displays the selected target surface and the assistance region.

Moreover, in the construction information display device according to the present invention, the range of the target surface and the range of the assistance region are displayed using different display modes from each other.

Moreover, a method for displaying construction information configured to display construction information according to the present invention is a method of displaying construction information including: displaying at least a partial distribution map indicating a current landform and a design landform; and displaying, when a target surface is selected from the design landform, a range of the selected target surface while visibly displaying the partial distribution map within the selected target surface.

According to the invention, it is possible to visually recognize a target surface serving as a region to be constructed and a current landform relative to this target surface such as a condition of a current landform before construction or a condition of a current landform after construction (construction result), whereby workability and construction efficiency can be enhanced.

DESCRIPTION OF EMBODIMENTS

An embodiment for carrying out the invention will be described in detail with reference to the drawings. The content described in the following embodiment is not construed to limit the invention. Additionally, an excavator will be described as an example of a working machine in the following embodiment. However, a working machine determined as an object of the following embodiment is not limited to the excavator as long as the working machine includes a working instrument or the like capable of changing a shape of a landform.

(Overall Configuration of Working Machine)

Figure 1:
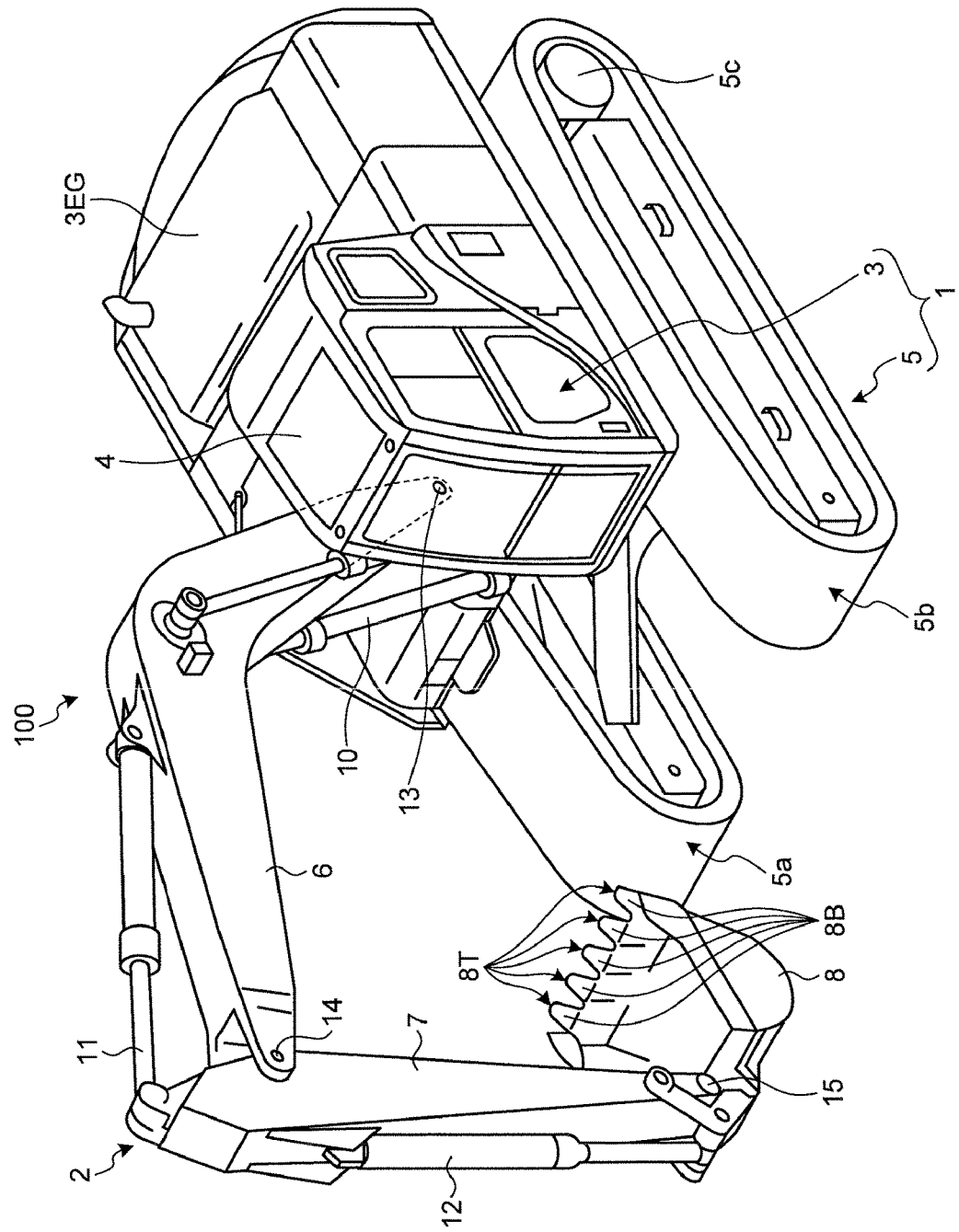
FIG. 1 is a perspective view illustrating an excavator according to an embodiment.
Figure 2:
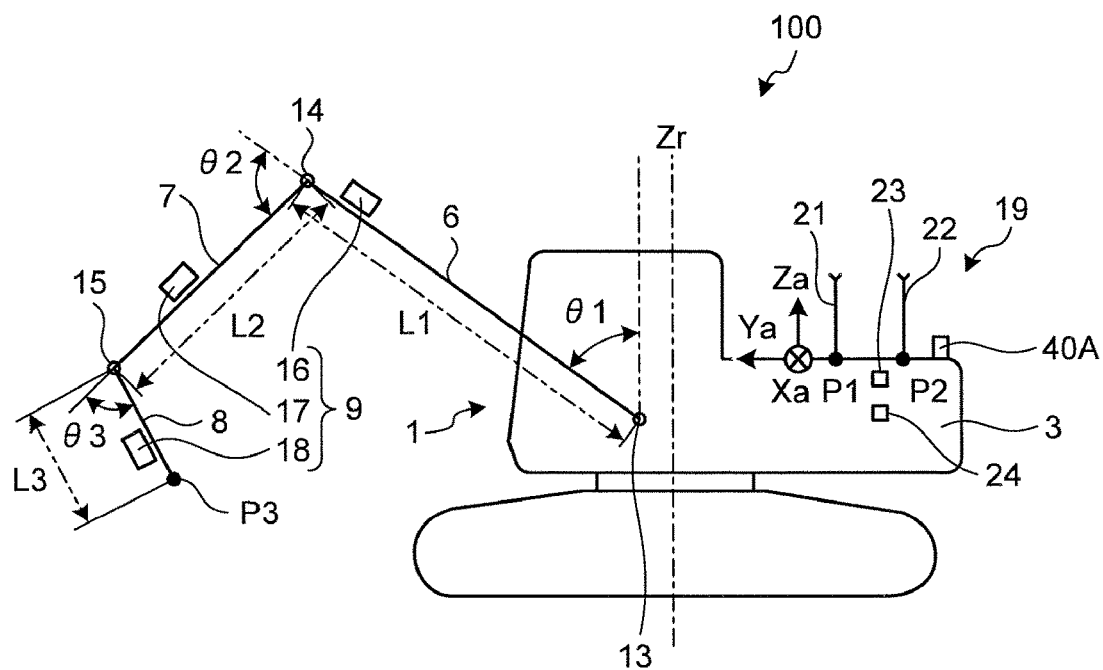
FIG. 2 is a lateral view of the excavator.
Figure 3:
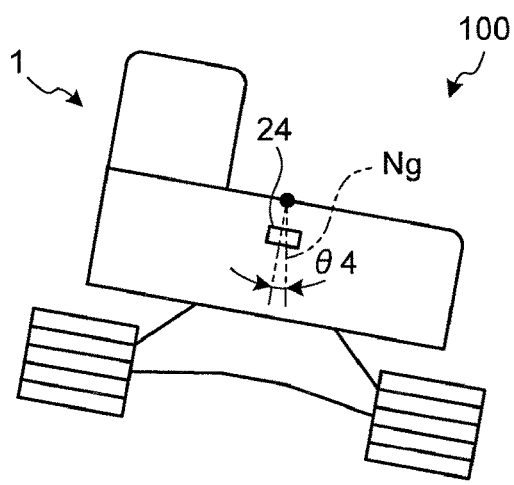
FIG. 3 is a rear view of the excavator.
Figure 4:
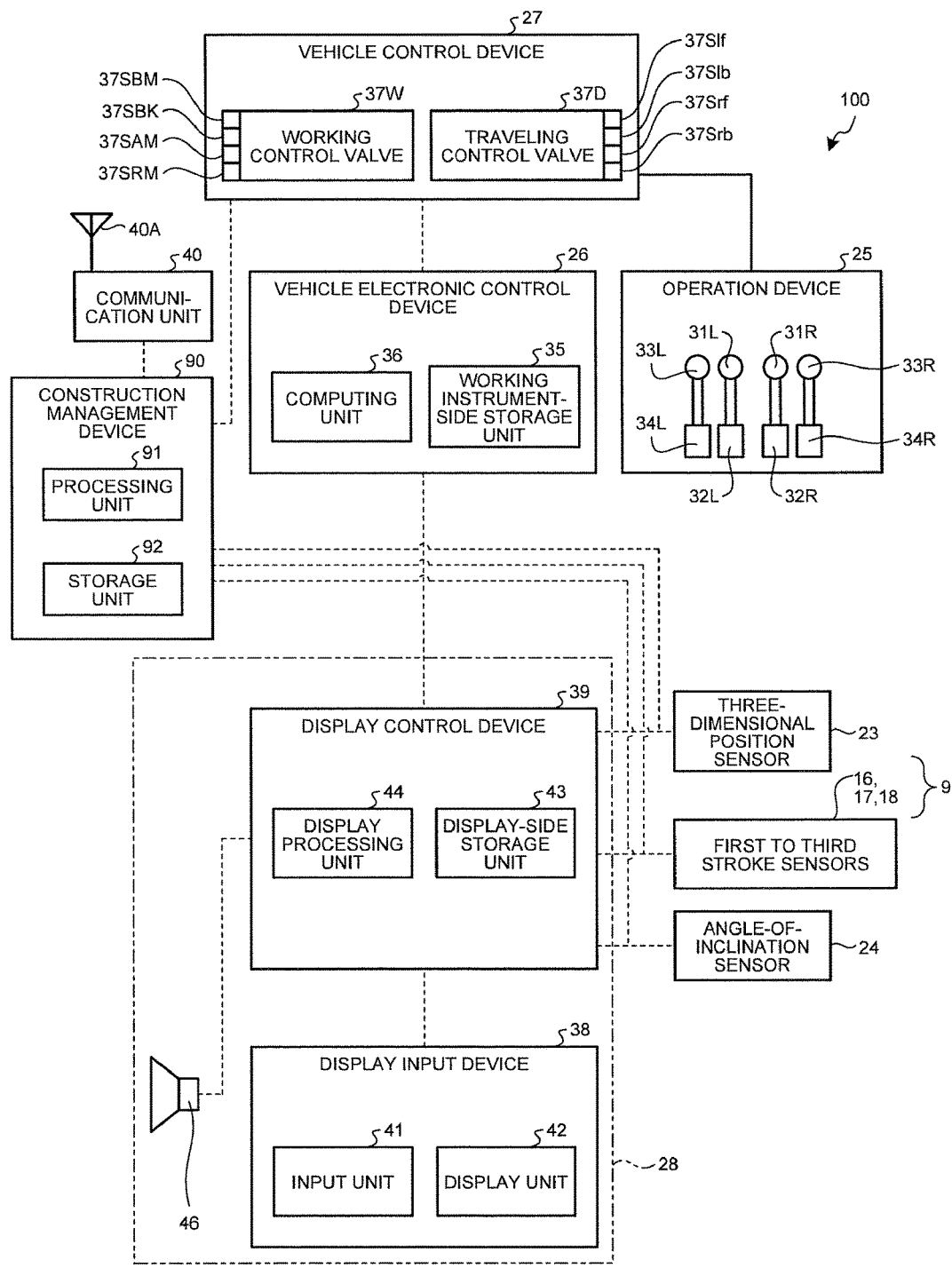
FIG. 4 is a block diagram illustrating a control system included in the excavator.

FIG. 1 is a perspective view illustrating an excavator 100 according to the embodiment. FIG. 2 is a lateral view of the excavator 100. FIG. 3 is a rear view of the excavator 100. FIG. 4 is a block diagram illustrating a control system included in the excavator 100. In the embodiment, the excavator 100 serving as the working machine includes a vehicle main body 1 serving as a main body unit and a working instrument 2. The vehicle main body 1 includes an upper swing structure 3 serving as a swing structure and a traveling device 5 serving as a traveling structure. The upper swing structure 3 accommodates devices such as a motive power generation device and a hydraulic pump (not illustrated) within a machine room 3EG. The machine room 3EG is disposed on one end side of the upper swing structure 3.

In the embodiment, the excavator 100 uses an internal-combustion engine such as a diesel engine as the motive power generation device. However, the excavator 100 is not limited to such engines. For example, the excavator 100 may include a so-called hybrid type motive power generation device or the like in which the internal-combustion engine, a generator motor, and an electric storage device are combined.

The upper swing structure 3 includes a driving room 4. The driving room 4 is placed on another end side of the upper swing structure 3. Specifically, the driving room 4 is disposed on an opposite side of a side where the machine room 3EG is disposed. A display input device 38 and an operation device 25 illustrated in FIG. 4 are disposed within the driving room 4. These devices will be described later. The traveling device 5 includes crawler belts 5a and 5b. The traveling device 5 drives one or both of hydraulic motors 5c disposed rightward and leftward to rotate the crawler belts 5a and 5b, thereby causing the excavator 100 to travel. The working instrument 2 is attached to a lateral side of the driving room 4 in the upper swing structure 3.

The excavator 100 may include tires instead of the crawler belts 5a and 5b so as to be equipped with a traveling device capable of traveling by transmitting drive power from a diesel engine (not illustrated) to the tires through a transmission. For example, a wheel type excavator may be employed as the excavator 100 of such a type. Furthermore, the excavator 100 may be a backhoe loader or the like including such a traveling device with the tires and additionally having a structure in which the working instrument is attached to the vehicle main body (main body unit) and the upper swing structure 3 and a swing mechanism thereof as illustrated in FIG. 1 are not provided. In other words, the backhoe loader is provided with the working instrument attached to the vehicle main body and the traveling device partially constituting the vehicle main body.

Front of the upper swing structure 3 is a side where the working instrument 2 and the driving room 4 are disposed, whereas rear thereof is a side where the machine room 3EG is disposed. A left side when viewed facing to the front is left of the upper swing structure 3, whereas a right side when viewed facing to the front is right of the upper swing structure 3. In addition, a bottom of the excavator 100 or the vehicle main body 1 is a side of the traveling device 5 when the upper swing structure 3 is assumed as a reference, whereas a top thereof is a side of the upper swing structure 3 when the traveling device 5 is assumed as a reference. When the excavator 100 is installed on a horizontal surface, the bottom is a side of a vertical direction, that is, a direction of gravity action, whereas the top is an opposite side of the vertical direction.

The working instrument 2 includes a boom 6, an arm 7, a bucket 8, a boom cylinder 10, an arm cylinder 11, and a bucket cylinder 12. A proximal end portion of the boom 6 is attached to a front portion of the vehicle main body 1 through a boom pin 13. A proximal end portion of the arm 7 is attached to a distal end portion of the boom 6 through an arm pin 14. The bucket 8 is attached to a distal end portion of the arm 7 through a bucket pin 15. The bucket 8 moves using the bucket pin 15 as a fulcrum.

As illustrated in FIG. 2, a length of the boom 6, that is, a length from the boom pin 13 to the arm pin 14 is represented by L1. A length of the arm 7, that is, a length from the center of the arm pin 14 to the center of the bucket pin 15 is represented by L2. A length of the bucket 8, that is, a length from the center of the bucket pin 15 to cutting edges 8T of the bucket 8 is represented by L3. As illustrated in FIG. 1, the cutting edge 8T is a distal end of a blade 8B attached to the bucket 8 on an opposite side of the bucket pin 15. The bucket 8 includes the plurality of blades 8B. The plurality of blades 8B is arranged in a line. A line of the plurality of cutting edges 8T is referred to as cutting edge line as necessary.

The bucket 8 may not include the plurality of blades 8B. Specifically, the bucket 8 may be a bucket including no blades 8B such as ones illustrated in FIG. 1 such that a cutting edge is made of a steel plate formed into a straight shape. The working instrument 2 may include a tilt bucket, for example. The tilt bucket is a bucket including a bucket tilt cylinder such that the bucket is capable of tilting rightward and leftward. Using the tilt bucket, the excavator 100 can form a slanted surface or a flatland to an arbitrary shape or level a ground even when being installed on a sloping ground. In addition to this, the working instrument 2 may include, instead of the bucket 8 as illustrated in FIG. 1, a slope finishing bucket suitable for slope construction, a drilling attachment including a drilling tip, or the like.

Each of the boom cylinder 10, the arm cylinder 11, and the bucket cylinder 12 illustrated in FIG. 1 is a hydraulic cylinder driven by pressure of operating oil (hereinafter, referred to as oil pressure as necessary). The boom cylinder 10 drives the boom 6 to move upward and downward. The arm cylinder 11 is coupled to the arm 7 and controls the arm 7 using the arm pin 14 as a fulcrum. The bucket cylinder 12 is coupled to the bucket 8 and controls the bucket 8 using the bucket pin 15 as a fulcrum. A traveling control valve 37D and a working control valve 37W illustrated in FIG. 4 are disposed between a hydraulic cylinder such as the boom cylinder 10, the arm cylinder 11, and the bucket cylinder 12 and the hydraulic pump (not illustrated). A vehicle electronic control device 26 described later controls the traveling control valve 37D and the working control valve 37W so as to control a flow rate of the operating oil supplied to the boom cylinder 10, the arm cylinder 11, and the bucket cylinder 12, or the hydraulic motors 5c and a swing motor (not illustrated). As a result, the movement of the boom cylinder 10, the arm cylinder 11, and the bucket cylinder 12, or the upper swing structure 3 and the traveling device 5 is controlled.

As illustrated in FIG. 2, the boom 6, the arm 7, and the bucket 8 are provided with a first stroke sensor 16, a second stroke sensor 17, and a third stroke sensor 18, respectively. The first stroke sensor 16, the second stroke sensor 17, and the third stroke sensor 18 function as an attitude detection unit 9 that detects an attitude of the working instrument 2. The first stroke sensor 16 detects a length of stroke of the boom cylinder 10. A display control device 39 (refer to FIG. 4) described later calculates an angle of inclination $\theta 1$ of the boom 6 relative to a Za axis in a vehicle main body coordinate system described later based on the length of stroke of the boom cylinder 10 detected by the first stroke sensor 16. The second stroke sensor 17 detects a length of stroke of the arm cylinder 11. The display control device 39 calculates an angle of inclination $\theta 2$ of the arm 7 relative to the boom 6 based on the length of stroke of the arm cylinder 11 detected by the second stroke sensor 17. The third stroke sensor 18 detects a length of stroke of the bucket cylinder 12. The display control device 39 calculates an angle of inclination $\theta 3$ of the bucket 8 relative to the arm 7 based on the length of stroke of the bucket cylinder 12 detected by the third stroke sensor 18.

The vehicle main body 1 includes a position detection unit 19 as illustrated in FIG. 2. The position detection unit 19 detects a current position of the excavator 100. The position detection unit 19 includes two antennas 21 and 22 for real time kinematic-global navigation satellite systems (RTK-GNSS, where GNSS stands for global navigation satellite systems) (hereinafter, referred to as GNSS antennas 21 and 22 as necessary), a three-dimensional position sensor 23, and an angle-of-inclination sensor 24. The GNSS antennas 21 and 22 are installed in the vehicle main body 1, more specifically, the upper swing structure 3. An origin of the vehicle main body coordinate system (Xa, Ya, Za) is defined to a certain point in accordance with a design dimension of the vehicle main body 1. Information on coordinates of the origin on the vehicle main body coordinate system (Xa, Ya, Za) is stored in a working instrument-side storage unit 35 in advance.

It is preferable for the GNSS antennas 21 and 22 to be installed at positions on both respective ends of the excavator 100 separated from each other in a left-right direction on the top of the upper swing structure 3. Alternatively, the GNSS antennas 21 and 22 may be installed on a counterweight (a rear end of the upper swing structure 3) (not illustrated) or a rear side of the driving room 4 on the top of the upper swing structure 3. In any cases, detection accuracy of the current position of the excavator 100 is enhanced when the GNSS antennas 21 and 22 are installed at positions as separated from each other as possible. In addition, it is preferable for the GNSS antennas 21 and 22 to be installed at positions most unlikely to obstruct a field of vision of the operator. The attitude detection unit 9 and the position detection unit 19 functioning as vehicle state detection units can detect a vehicle state as information on a position (current position) of the excavator 100 serving as the working machine and an attitude of the working instrument 2.

Signals in accordance with GNSS radio waves received by the GNSS antennas 21 and 22 are input to the three-dimensional position sensor 23. The three-dimensional position sensor 23 detects installation positions P1 and P2 of the GNSS antennas 21 and 22, respectively. As illustrated in FIG. 3, the angle-of-inclination sensor 24 detects an angle of inclination $\theta 4$ in a width direction of the vehicle main body 1 relative to a direction in which the gravity acts, that is, the vertical direction Ng (hereinafter, referred to as roll angle $\theta 4$ as necessary). Note that the width direction in the embodiment indicates a width direction of the bucket 8 and thus matches a width direction of the upper swing structure 3, that is, the left-right direction.

The upper swing structure 3 swings about a predetermined axis Zr. The predetermined axis Zr is referred to as swing central axis Zr as necessary. The swing central axis Zr is an axis parallel to the Za axis of the vehicle main body coordinate system. The upper swing structure 3 includes an antenna 40A in addition to the GNSS antennas 21 and 22. The antenna 40A is used for wireless communication of information between the excavator 100 and the outside thereof.

The control system of the excavator 100 will be described with reference to FIG. 4. The excavator 100 includes the operation device 25, the vehicle electronic control device 26, a vehicle control device 27, a construction information display device 28, a communication unit 40, and a construction management device 90 for the working machine. The operation device 25 includes working instrument operation members 31L and 31R and traveling operation members 33L and 33R serving as operation units, working instrument operation detection units 32L and 32R, and traveling operation detection units 34L and 34R. In the embodiment, the working instrument operation members 31L and 31R and the traveling operation members 33L and 33R are pilot pressure-type levers. However, the operation members are not limited thereto. For example, the working instrument operation members 31L and 31R and the traveling operation members 33L and 33R may be electric type levers. In this case, the working instrument operation detection units 32L and 32R and the traveling operation detection units 34L and 34R function as operation detection units that detect input to the working instrument operation members 31L and 31R and the traveling operation members 33L and 33R serving as the operation units, respectively.

The working instrument operation members 31L and 31R are members used by the operator to control the working instrument 2 or the upper swing structure 3 and are operation levers such as joysticks including grip portions and bars. The working instrument operation members 31L and 31R having such a structure can be inclined frontward, rearward, rightward, and leftward by gripping the grip portion. The working instrument operation members 31L and 31R are installed on the left side and the right side of a driver's seat (not illustrated), respectively, within the driving room 4. For example, the arm 7 and the upper swing structure 3 can be controlled by operating the working instrument operation member 31L installed on the left side, whereas the bucket 8 and the boom 6 can be controlled by operating the working instrument operation member 31R installed on the right side.

The working instrument operation detection units 32L and 32R generate pilot pressure depending on input to the working instrument operation members 31L and 31R, specifically, operation content, respectively, to supply the generated pilot pressure for the operating oil to the working control valve 37W included in the vehicle control device 27. The working control valve 37W moves depending on the degree of the pilot pressure, whereby the operating oil is supplied to the boom cylinder 10, the arm cylinder 11, the bucket cylinder 12, and the like illustrated in FIG. 1 from the hydraulic pump (not illustrated). In a case where the working instrument operation members 31L and 31R are electric type levers, the working instrument operation detection units 32L and 32R detect input to the working instrument operation members 31L and 31R, specifically, operation content using a potentiometer or the like, respectively, and convert the input to electrical signals (detection signals) to transmit to the vehicle electronic control device 26. The vehicle electronic control device 26 controls the working control valve 37W based on these detection signals.

The traveling operation members 33L and 33R are members used by the operator to operate the excavator 100 so as to travel. The traveling operation members 33L and 33R are, for example, operation levers including grip portions and bars (hereinafter, referred to as traveling levers as necessary). Such traveling operation members 33L and 33R can be inclined frontward and rearward by the operator gripping the grip portion. The traveling operation members 33L and 33R are used to move the excavator 100 forward when the two operation levers are simultaneously inclined frontward and to move the excavator 100 backward when the two operation levers are simultaneously inclined rearward. Alternatively, the traveling operation members 33L and 33R are pedals (not illustrated) that can be operated by the operator stepping thereon with his/her feet and are seesaw type pedals. The pilot pressure is generated, as in the case of the aforementioned operation levers, by stepping on front sides or rear sides of the pedals to control the traveling control valve 37D and then the hydraulic motors 5c are driven to thereby move the excavator 100 forward or backward. The excavator 100 moves forward when the front sides of the two pedals are simultaneously stepped on, whereas the excavator 100 moves backward when the rear sides of the two pedals are simultaneously stepped on. Additionally, the excavator 100 can swing when the front side or the rear side of one of the pedals is stepped on to rotate one of the crawler belts 5a and 5b.

The traveling operation detection units 34L and 34R generate pilot pressure depending on input to the traveling operation members 33L and 33R, specifically, operation content, respectively, to supply the generated pilot pressure to the traveling control valve 37D included in the vehicle control device 27. The traveling control valve 37D moves depending on the degree of the pilot pressure, whereby the operating oil is supplied to the hydraulic motors 5c for traveling. In a case where the traveling operation members 33L and 33R are electric type levers, the traveling operation detection units 34L and 34R detect input to the traveling operation members 33L and 33R, specifically, operation content using a potentiometer or the like, respectively, and convert the input to electrical signals (detection signals) to transmit to the vehicle electronic control device 26. The vehicle electronic control device 26 controls the traveling control valve 37D based on these detection signals.

The vehicle electronic control device 26 includes the working instrument-side storage unit 35 having at least one of a random access memory (RAM) and a read only memory (ROM), and a computing unit 36 such as a central processing unit (CPU). The vehicle electronic control device 26 controls an engine and the hydraulic pump included in the excavator 100. The computing unit 36 executes a computer program for controlling the engine and the hydraulic pump. The working instrument-side storage unit 35 stores the computer program for controlling the engine and the hydraulic pump, or the like. As described earlier, the information on the coordinates of the origin on the vehicle main body coordinate system COM is also stored in the working instrument-side storage unit 35. Additionally, information on coordinates of a swing center position on the vehicle main body coordinate system COM is also stored in the working instrument-side storage unit 35. In a case where the working instrument operation members 31L and 31R and the traveling operation members 33L and 33R are electric type levers, the vehicle electronic control device 26 also controls the movement of the working instrument 2, the upper swing structure 3, and the traveling device 5. In this case, the vehicle electronic control device 26 generates control signals for controlling the working instrument 2 or the traveling device 5 depending on the operation of the working instrument operation members 31L and 31R or the traveling operation members 33L and 33R, respectively, to output to the vehicle control device 27.

The vehicle control device 27 is a hydraulic instrument having a hydraulic control valve and the like and includes the traveling control valve 37D and the working control valve 37W. These valves are controlled by the pilot pressure from the working instrument operation detection units 32L and 32R and the traveling operation detection units 34L and 34R. In a case where the working instrument operation members 31L and 31R and the traveling operation members 33L and 33R are electric type levers, the traveling control valve 37D and the working control valve 37W are controlled based on the control signals from the vehicle electronic control device 26.

The vehicle control device 27 includes hydraulic sensors 37Slf, 37Slb, 37Srf, and 37Srb that detect the degree of the pilot pressure supplied to the traveling control valve 37D to generate corresponding electrical signals. The hydraulic sensor 37Slf detects the pilot pressure for moving left and forward, whereas the hydraulic sensor 37Slb detects the pilot pressure for moving left and backward. Likewise, the hydraulic sensor 37Srf detects the pilot pressure for moving right and forward, whereas the hydraulic sensor 37Srb detects the pilot pressure for moving right and backward. The vehicle electronic control device 26 acquires the electrical signals generated by the hydraulic sensors 37Slf, 37Slb, 37Srf, and 37Srb, which indicate the degree of the pilot pressure for the operating oil detected thereby. These electrical signals are used for the control of the engine or the hydraulic pump, or the movement of the construction management device described later, or the like. As described above, the working instrument operation members 31L and 31R and the traveling operation members 33L and 33R according to the embodiment are pilot pressure-type levers. In this case, the hydraulic sensors 37Slf, 37Slb, 37Srf, and 37Srb and hydraulic sensors 37SBM, 37SBK, 37SAM, and 37SRM described later function as the operation detection units that detect input to the working instrument operation members 31L and 31R and the traveling operation members 33L and 33R serving as the operation units.

In a case where the working instrument operation members 31L and 31R are pilot pressure-type operation levers, the operating oil is flowed out from the working control valve 37W at a flow rate corresponding to the pilot pressure generated in accordance with the operation of the working instrument operation members 31L and 31R when the operator of the excavator 100 operates these operation levers. The operating oil flowed out from the working control valve 37W is supplied at least one of the boom cylinder 10, the arm cylinder 11, the bucket cylinder 12, and the swing motor. Subsequently, at least one of the boom cylinder 10, the arm cylinder 11, the bucket cylinder 12 illustrated in FIG. 1 and the swing motor moves to expand and contract in the case of the cylinders, or is driven to swing in the case of the swing motor, in accordance with the operating oil supplied from the working control valve 37W. As a result, at least one of the working instrument 2 and the upper swing structure 3 moves.

The vehicle control device 27 includes the hydraulic sensors 37SBM, 37SBK, 37SAM, and 37SRM that detect the degree of the pilot pressure supplied to the working control valve 37W to generate electrical signals. The hydraulic sensor 37SBM detects the pilot pressure corresponding to the boom cylinder 10, the hydraulic sensor 37SBK detects the pilot pressure corresponding to the arm cylinder 11, the hydraulic sensor 37SAM detects the pilot pressure corresponding to the bucket cylinder 12, and the hydraulic sensor 37SRM detects the pilot pressure corresponding to the swing motor. The vehicle electronic control device 26 acquires the electrical signals generated by the hydraulic sensors 37SBM, 37SBK, 37SAM, and 37SRM, which indicate the degree of the pilot pressure detected thereby. These electrical signals are used for the control of the engine or the hydraulic pump, or the movement of the construction management device 90 described later, or the like.

(Construction Management Device 90)

The construction management device 90 includes a processing unit 91 and a storage unit 92. The construction management device 90, more specifically, the processing unit 91 generates construction management information for the excavator 100. The construction management information is information including a current landform indicating a result of the construction by the excavator 100 for a region to be constructed. The region to be constructed is a working site constructed by the excavator 100 such as a place where soil is excavated, a place where the ground is excavated to form a groove, a place subjected to slope finishing, or the like. The construction management information is expressed by, for example, a global coordinate system. Information on the current landform is updated substantially in real-time to reflect a result of the construction by the excavator 100. More specifically, the excavator 100 can obtain a cutting edge position P3 of the bucket 8 as will be described later. Therefore, when the working instrument 2 is operated to excavate a region to be constructed, the excavator 100 accumulates traces of the cutting edge position P3 to thereby acquire a result of construction, that is, information indicating a landform after construction (the information on the current landform) while precisely updating. The cutting edge position P3 is expressed by the vehicle main body coordinate system whose origin is defined to a predetermined position of the excavator 100 and converted to the global coordinate system by the processing unit 91 to be obtained as the information on the current landform. The acquired information on the current landform can be stored in the storage unit 92. The information on the current landform includes a distribution map D1 described later. As will be described later, the distribution map can be created in accordance with a height h from a design surface S0 by the global coordinate system based on the information on the current landform expressed by the global coordinate system, namely, a current surface SB.

The information on the current landform such as the cutting edge position P3 of the bucket 8 may be wirelessly communicated to an external server through the communication unit 40 such that the information on the current landform is accumulated on the server or the distribution map D1 described later is created on the server. In this case, the function of the construction management device 90 is provided in the server.

The storage unit 92 stores the construction management information generated by the processing unit 91, design landform information created in advance, and the like. The design landform information includes information on a shape and a position of a three-dimensional design landform serving as a construction target. The construction management information includes an initial current landform. The initial current landform is information indicating a landform before construction obtained in advance through surveying or the like. For example, this initial current landform is acquired from a management server of a construction management system (not illustrated) through a communication means. Thereafter, the construction is started based on the initial current landform and the current landform afterward in the construction management information is precisely updated as information indicating a landform reflecting the construction result substantially in real-time. The information on the initial current landform includes the distribution map D1 described later. In this case, using a method described later, the distribution map D1 can be created for a height from the design surface S0 toward an upper side of the vertical direction relative to the information on the initial current landform indicating a landform before construction, which is obtained through surveying.

The three-dimensional position sensor 23, the attitude detection unit 9 constituted by the first stroke sensor 16, the second stroke sensor 17, and the third stroke sensor 18, and the angle-of-inclination sensor 24 are connected to the construction management device 90. In addition, the construction management device 90 can receive the electrical signals generated by the respective hydraulic sensors such as the hydraulic sensors 37Slf, 37Slb, 37Srf, and 37Srb, and the hydraulic sensors 37SBM, 37SBK, 37SAM, and 37SRM. The construction management device 90 acquires a detection value from each of these sensors. The communication unit 40 including the antenna 40A described earlier is connected to the construction management device 90. The construction management device 90 transmits/receives information, through the communication unit 40 using the wireless communication, to/from the outside of the excavator 100, for example, the construction management system managing the construction by the excavator 100. Ground wave communication or satellite communication can be used for the wireless communication. The aforementioned construction management information and the like can be intercommunicated between the excavator 100 and the construction management system through the wireless communication. The management server in the construction management system acquires the construction management information including the current landforms updated by the plurality of working machines such as the excavators 100 to update to a single piece of the construction management information. This single piece of the construction management information is transmitted to the respective working machines. Specifically, a single construction result is updated based on construction results by the respective working machines, while the respective working machines can capture the updated construction result, that is, the information on the current landform substantially in real-time to display. As a result, based on the captured information on the current landform, the construction information display device 28 can display, on a display unit 42, the distribution map D1 described later serving as the construction information.

Based on detection results of the aforementioned vehicle state detection unit, the processing unit 91 obtains working instrument positional information serving as information on a position of the working instrument 2, in particular, the cutting edge position P3 (refer to FIG. 2) and uses this working instrument positional information to generate the construction management information serving as the construction result of the excavator 100.

(Construction Information Display Device 28)

The construction information display device 28 shows, for the operator, information indicating the design landform or a landform shape of the target surface serving as a region to be constructed, or information on the attitude or the position of the working instrument 2. When the operator operates the working instrument 2 for construction by, for example, excavating the ground serving as a region to be constructed such that the design landform is obtained, the operator can use the information indicated on the construction information display device 28 to achieve efficient construction. In other words, the construction information display device 28 is a device capable of aiding the operator during operation of the working instrument 2 by displaying the construction information such as the target surface or a partial distribution map described later. The construction information display device 28 includes the display input device 38, the display control device 39, a sound generation device 46 including a speaker for issuing a warning sound or the like.

The display input device 38 includes a touch panel-type input unit 41 and the display unit 42 such as a liquid crystal display (LCD). The display input device 38 displays an instruction screen to provide information for construction such as excavation. In addition, various types of keys are displayed on the instruction screen. The operator of the excavator 100 touches the various types of keys on the instruction screen to thereby execute various types of functions of the construction information display device 28. The display input device 38 may be constituted by a display device including a liquid crystal screen serving as the display unit 42 and an input device including a key switch serving as the input unit 41.

The display control device 39 executes the various types of functions of the construction information display device 28. The display control device 39 includes a display-side storage unit 43 and a display processing unit 44.

Figure 5:
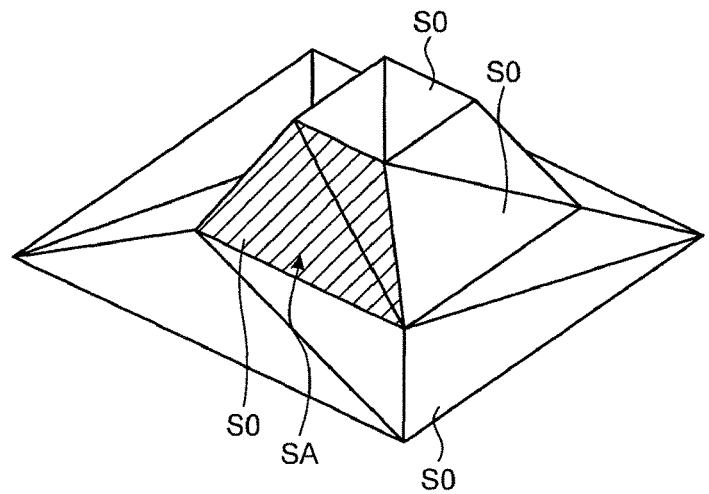
FIG. 5 is an exemplary design landform displayed as a polygonal image.

The display control device 39 and the vehicle electronic control device 26 can communicate with each other through a wireless or wired communication means. For example, an in-vehicle local area network (LAN) is used as the wired communication means. Based on the information such as the aforementioned design landform information and the detection values from the aforementioned respective sensors, the display control device 39 displays the instruction screen on the display unit 42 of the display input device 38. In this case, for example, the display control device 39 reads the design landform information from the storage unit 92 of the construction management device 90 to use for display of the instruction screen. The design landform has the plurality of design surfaces S0 each expressed by a triangular polygon as illustrated in FIG. 5 as an example. A region to be constructed (target surface SA) is represented by one or multiple design surfaces S0 among these design surfaces S0. The operator touches a screen functioning as the input unit 41 with a fingertip on the display unit 42 displaying one or multiple design surfaces S0 among these design surfaces S0, namely, the design landform to select the target surface SA. The target surface SA here is a surface among the plurality of design surfaces S0, which will be constructed by the excavator 100 hereafter. The display control device 39 displays the instruction screen on the display input device 38 to inform the operator of a position or a range of the target surface SA. In addition to this, the display control device 39 can also display the construction management information from the construction management device 90 and the like on the display unit 42 of the display input device 38.

(Top View Display Processing)

Figure 6:
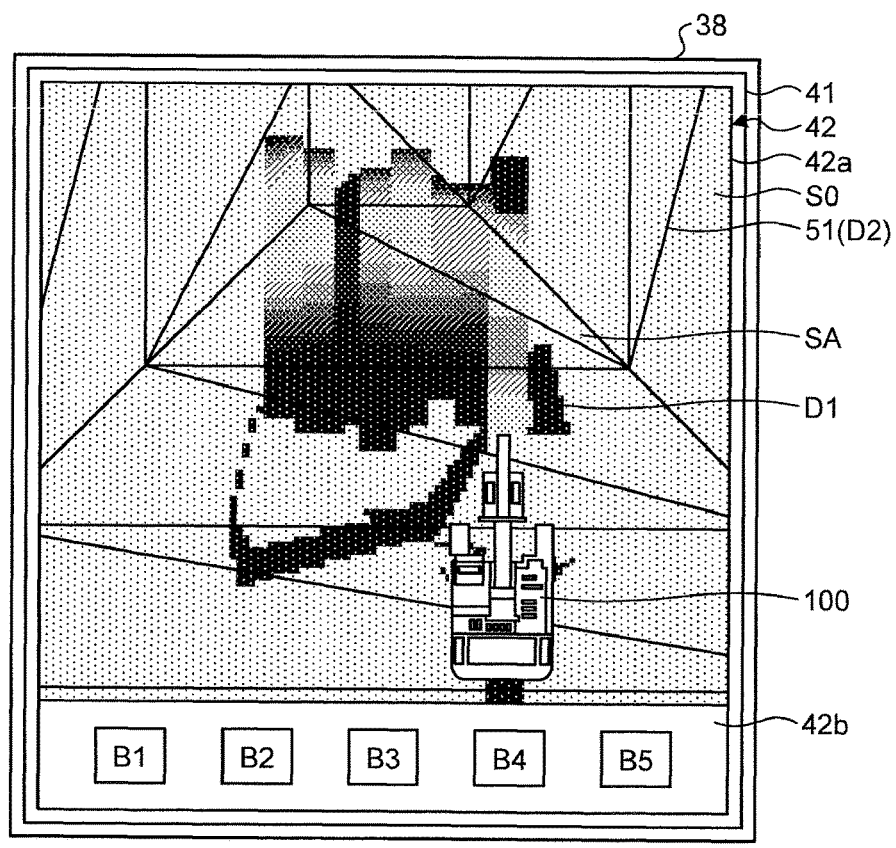
FIG. 6 is an exemplary view in which a distribution map and the design landform are displayed on the same display screen.

The display unit 42 of the display input device 38 can display a display screen 42a representing a top view as illustrated in FIG. 6 under the control of the display processing unit 44 of the display control device 39. This top view is observed from the upper side of the vertical direction and includes the distribution map D1 indicating a current landform constructed by the excavator 100 and a design landform view D2 in which the design landform to be constructed by the excavator 100 is displayed as a polygonal image using a plurality of frame lines 51 of the design surfaces S0. In addition, an image of the excavator 100 observed from the upper side of the vertical direction is displayed on the top view such that a position of the excavator 100 relative to the current landform can be visually recognized. Here, in order to display a place where no construction is carried out, the distribution map D1 based on the information on the initial current landform indicating a landform before construction, which is obtained through surveying, may be displayed on the display screen 42*a*.

Additionally, a display screen 42*b* in a lower part of the display unit 42 displays, for example, a screen switching button B1, a top view switching button B2, a highlight mode selection button B3, an isolation mode selection button B4, and a setting button B5. These buttons serve as setting units for configuring settings and the like of the display unit 42.

The screen switching button B1 is a button used to cyclically select various types of screens such as the top view, a lateral view, and a three-dimensional display view to switch thereto. The top view switching button B2 is a button used to select whether to display, on the top view (display screen 42*a*), the distribution map D1 only, the design landform view D2 only, or both of the distribution map D1 and the design landform view D2.

The highlight mode selection button B3 is a button used to select a highlight mode. As will be described later, in the highlight mode, when the target surface SA serving as a region to be constructed (refer to FIGS. 5 and 6) is selected while the distribution map D1 and the design landform view D2 are displayed on the display unit 42, the display processing unit 44 highlights the selected target surface SA to display a range of the selected target surface SA on the display unit 42 while visibly displaying the partial distribution map within the selected target surface SA. In this case, the partial distribution map may be visibly displayed while an area of the distribution map D1 other than the partial distribution map is not displayed.

The isolation mode selection button B4 is a button used to select an isolation mode described later. The setting button B5 is a button that a service person or the like presses in order to set detailed content of the highlight mode or detailed content of the isolation mode in advance. When the setting button B5 is pressed, a guidance screen for configuring various types of settings is displayed.

(Display Content of Distribution Map)

The distribution map D1 indicates a depth from the design landform to the current surface on the upper side of the vertical direction using colors including shades to display. The distribution map D1 is a distribution map indicating the current landform. The display processing unit 44 carries out processing to display this distribution map D1 on the display unit 42. As a result, the distribution map D1 can indicate at least the current surface relative to the design landform as a three-dimensional display.

Figure 7:
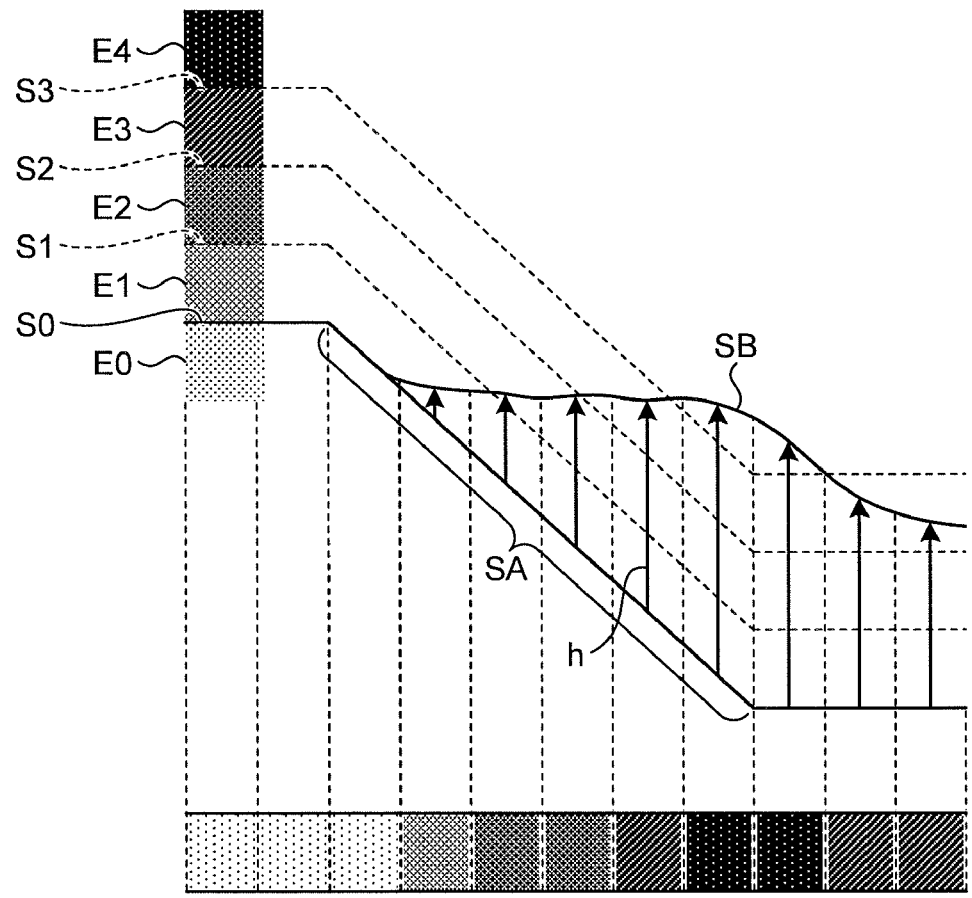
FIG. 7 is an explanatory diagram for explaining a display of the distribution map.

FIG. 7 is an explanatory diagram for explaining a display of the distribution map D1. As illustrated in FIG. 7, imaginary contour lines S1 to S3 are set above the design surface S0 to indicate a height from the design surface S0 toward the upper side of the vertical direction. The display control device 39 gradually changes colors in the distribution map D1 as the height h from the design surface S0 to the current surface SB becomes larger. For example, colors become darker or brightness becomes higher as the height h becomes larger. Alternatively, blue, blue green, green, yellow, orange, and red are used in this order as the height h becomes larger. In FIG. 7, a region E0 in which the height h is equal to or lower than the design surface S0, a region E1 in which the height h is higher than the design surface S0 and equal to or lower than a contour line S1, a region E2 in which the height h is higher than the contour line S1 and equal to or lower than a contour line S2, a region E3 in which the height h is higher than the contour line S2 and equal to or lower than a contour line S3, and a region E4 in which the height h is higher than the contour line S3 are displayed using darker colors in this order. Such a colored display indicates the degree of the completion of construction as a consequence.

(Highlighted Display of Target Surface SA Using Semi-Transparency)

Figure 8:
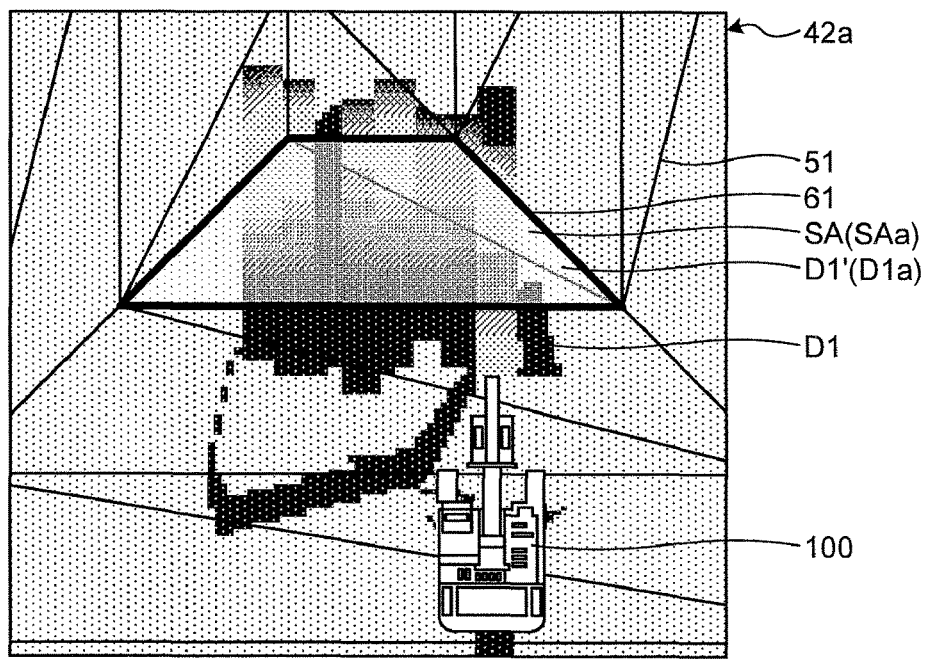
FIG. 8 is an exemplary view displaying a partial distribution map corresponding to a target surface by semi-transparently displaying a region of the target surface when the target surface is selected in the display state illustrated in FIG. 6.

Here, when the target surface SA is selected in FIG. 6, the display processing unit 44 highlights the target surface SA on the display unit 42 as illustrated in FIG. 8. Assuming that the target surface SA is selected and a region of the target surface SA is filled with a solid color, a range of the distribution map D1 corresponding to the target surface SA, that is, the partial distribution map is covered by the target surface SA and cannot be displayed. For a solution to this, the display processing unit 44 according to the embodiment carries out the processing such that the display unit 42 semi-transparently displays the target surface SA as illustrated in FIG. 8, thereby enabling the partial distribution map D1' corresponding to the target surface to be visually recognized. For example, a semi-transparent display can be obtained using the following method. A blend factor a for the target surface SA and a blend factor b for the partial distribution map D1' are allocated such that the total thereof sums to one. Thereafter, the target surface SA by the blend factor a, namely, a target surface SAa and the partial distribution map D1' by the blend factor b, namely, a partial distribution map D1*a* are added to obtain a semi-transparent display. The blend factors a and b are elements set in addition to the color elements R, G, and B. By changing values of the blend factors a and b, the degrees of transparency for the target surface SAa and the partial distribution map D1*a* are changed. Using such a method, the target surface SA can be semi-transparently displayed on appearance. The degree (ratio) of transparency can be set in advance on a setting screen that opens when the aforementioned setting button B5 is pressed. Whether to use this highlighted display can be switched using the highlight mode selection button B3. In addition, a frame line 61 of the target surface SA is displayed in FIG. 8 to further highlight the target surface SA. The method for obtaining a semi-transparent display indicated here is an example and another method may be used.

In the embodiment, the region of the selected target surface SA is highlighted using semi-transparency, whereby a range of the selected target surface SA is displayed. Accordingly, both of the region of the target surface SA serving as a region to be constructed and the current landform by the partial distribution map D1' corresponding to the region of the target surface SA can be visually recognized at the same time and thus workability of the operator can be enhanced.

(Highlighted Display of Target Surface SA Using Pattern)

Figure 9:
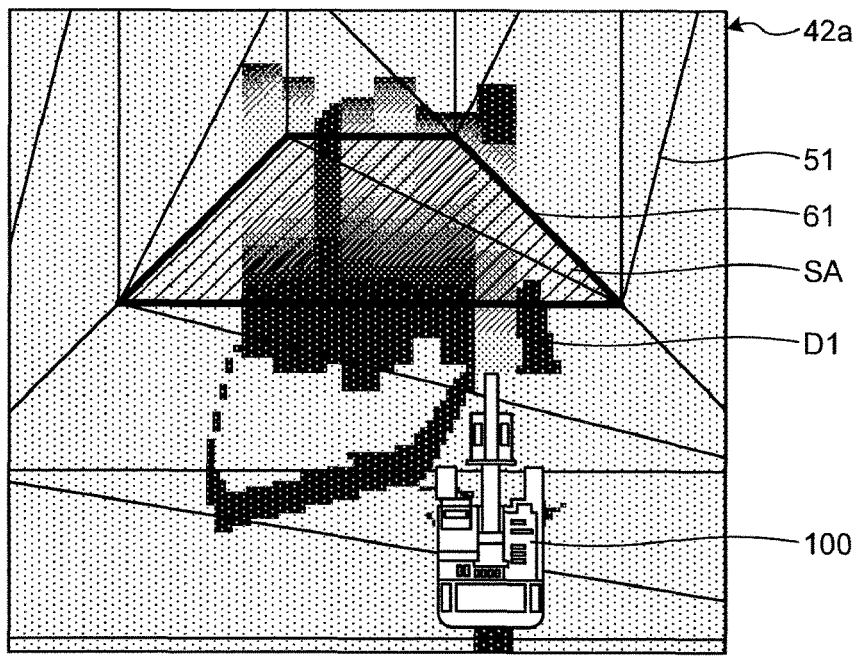
FIG. 9 is an exemplary view highlighting the target surface using a pattern to display a construction result through gaps in the pattern of the target surface.

Instead of highlighting the target surface SA using semi-transparency as described above, the target surface SA may be highlighted using a pattern as illustrated in FIG. 9, whereby the range of the selected target surface SA is displayed. In FIG. 9, hatching with oblique lines is used in drawing processing for a region within the target surface SA. Additionally, the partial distribution map corresponding to the region of the target surface SA is displayed in a hidden region where a hatching pattern is not displayed. The hatching pattern is drawing processing using separated lines within the target surface SA and thus the partial distribution map out of the distribution map D1 can be visually recognized on the hidden region, that is, through gaps between the separated lines of the hatching pattern.

The pattern for the target surface SA is not limited to the hatching pattern and a predetermined pattern such as a shading pattern or a dot pattern can be used. In other words, by using a pattern with gaps separately disposed in a drawing, the partial distribution map is enabled to be visually recognized.

(Highlighted Display Using Frame Line)

Figure 10:
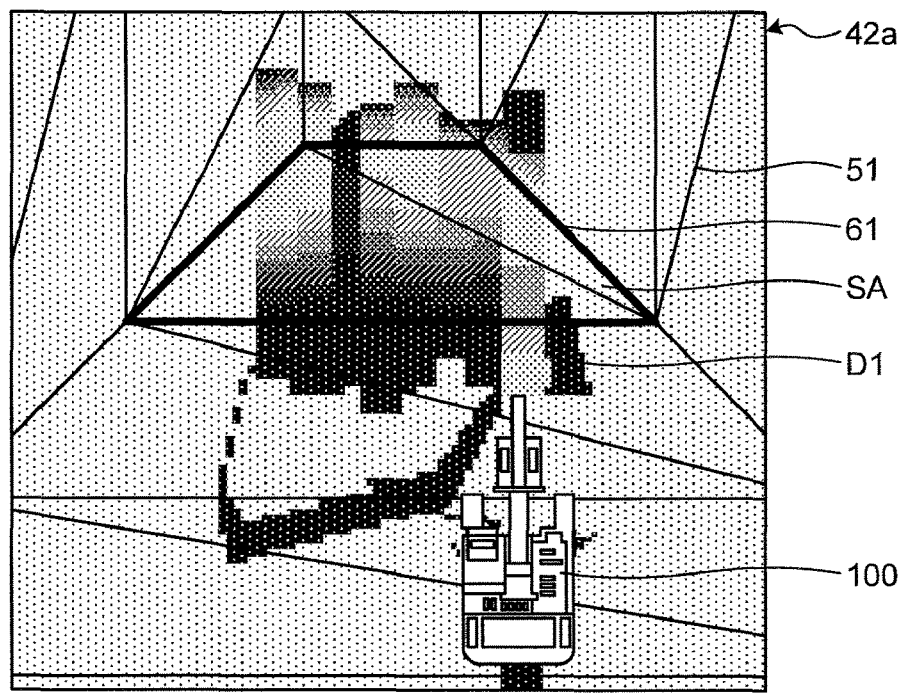
FIG. 10 is an exemplary view highlighting only a frame line corresponding to the target surface.

Furthermore, as illustrated in FIG. 10, the frame line 61 of the selected target surface SA may be displayed such that part of the target surface SA overlapping the partial distribution map within the target surface SA is made transparent, whereby the range of the selected target surface SA is displayed. With this, the range of the target surface SA can be visually recognized, while the partial distribution map within the target surface SA can be continued to be visually recognized at the same time.

(Highlighted Display of Assistance Region)

Figure 11:
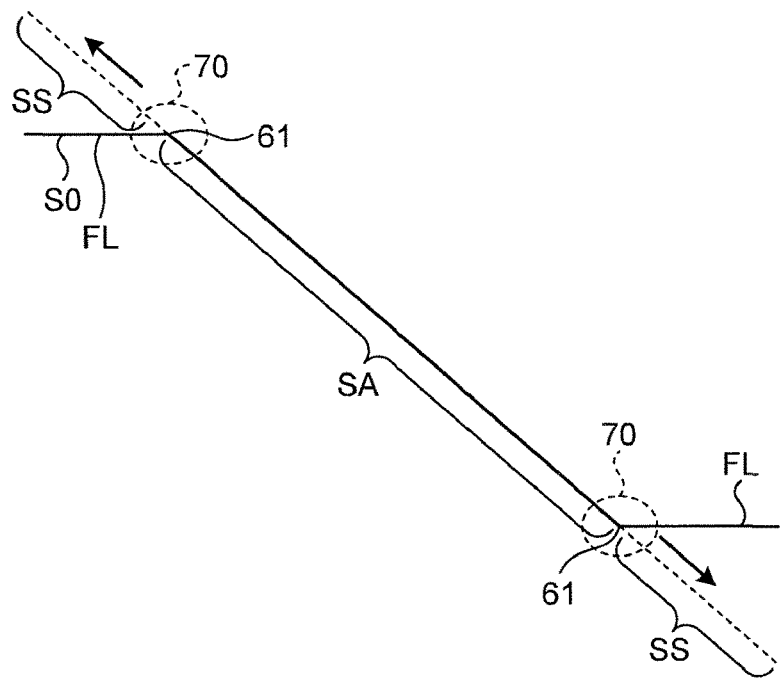
FIG. 11 is an explanatory diagram for explaining an assistance region for the target surface.

The excavator 100 as indicated in the embodiment can compute a relative position between the cutting edge position P3 and the target surface SA. Therefore, when the working instrument 2 is operated, the working instrument 2 can be controlled to limit the movement thereof by setting the target surface SA as a control reference such that the working instrument 2 does not bite into the target surface SA during excavation. For example, as illustrated in FIG. 11, there is a case where the target surface SA is a slanted surface including corner portions 70 in the periphery of the target surface SA, and a flat portion FL and the target surface SA including the corner portions 70 are determined as a region to be constructed. In this case, the flat portion FL and the target surface SA including the corner portions 70 serve as the control reference for the working instrument 2. It is complicated to control the working instrument 2 to limit the movement thereof during the construction by the working instrument 2 for these corner portions 70. Accordingly, in the case of the construction for such a region to be constructed, only the slanted surface of the target surface SA is set as the control reference for the construction as a first step. Compared to this, instead of setting the target surface SA as the control reference, in order to simplify the control for limiting the movement, a margin is added to the range of the target surface SA and then the target surface SA and the margin are set as the control reference. An assistance region SS serving as the margin is formed for the target surface SA as follows. The target surface SA is virtually expanded from the periphery of the target surface SA (frame line 61) toward the outside (in directions indicated by arrows in FIG. 11) to form the assistance region SS. As a result, the construction for the target surface SA can be simply carried out. Practically, the assistance region SS is a different region than the design surface S0. A mode for forming this assistance region is a mode set to control the working instrument 2 to limit the movement thereof. In the following description, this mode is referred to as the isolation mode. In another application example for the isolation mode, when a groove is excavated, for example, a bottom portion of the groove is virtually expanded from the periphery of the bottom portion toward the outside (in a width direction of the groove) to form the assistance region. By forming this assistance region, edges of the groove are not set as the control reference and thus the movement of the bucket 8 is not limited during the excavation of the groove based on a positional relationship between the positions of the edges of the groove and the cutting edge position P3 of the bucket 8. Consequently, the movement is not excessively limited, thereby allowing simpler construction.

Whether to apply the isolation mode can be selected using the isolation mode selection button B4. In addition, the setting button B5 is used to open an isolation mode setting screen. In this isolation mode setting screen, for example, a width of a belt-shaped assistance region SS can be set in advance. Detailed settings for highlighting the assistance region SS can be configured using a highlight setting screen of the isolation mode. Furthermore, the highlight mode selection button B3 may be used to switch highlighting on or off for the assistance region SS, or alternatively, a highlight mode selection button may be newly prepared for the assistance region SS.

Figure 12:
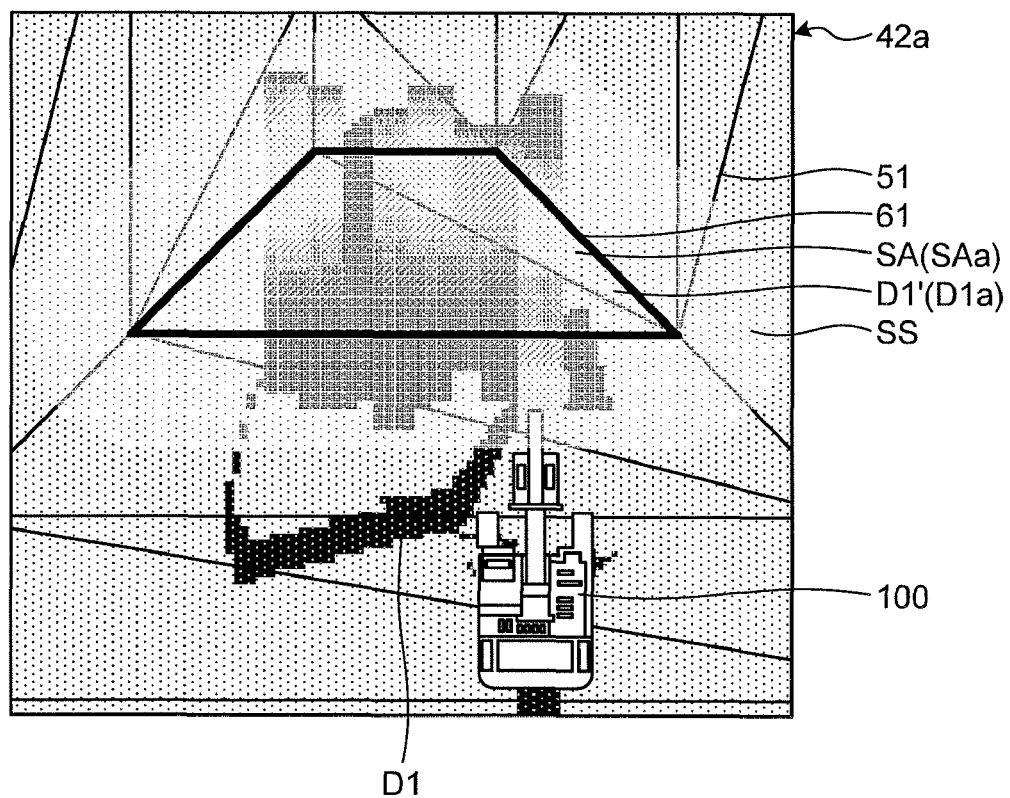
FIG. 12 is an exemplary view, in addition to the display state illustrated in FIG. 8, semi-transparently displaying the assistance region to highlight while displaying the distribution map corresponding to the target surface including the construction result corresponding to the assistance region.

FIG. 12 is a view illustrating a display screen semi-transparently displaying regions of the target surface SA and the assistance region SS to highlight. As illustrated in FIG. 12, the region of the target surface SA is indicated as being highlighted using semi-transparency as in FIG. 8. Accordingly, the range of the target surface SA can be recognized. The region of the assistance region SS is also semi-transparently displayed such that the partial distribution map corresponding to the assistance region SS can be visually recognized. Also in this case, the range of the target surface SA and the range of the assistance region SS can be visually recognized, while the partial distribution map within the assistance region SS, in addition to the partial distribution map within the target surface SA, can be continued to be visually recognized at the same time. In this case, the partial distribution map may be visibly displayed while an area of the distribution map D1 other than the partial distribution map is not displayed.

Unlike the target surface SA, the assistance region SS is an imaginary assistance region. Therefore, it is preferable that, for example, the blend factor for the assistance region SS be set to a smaller value than a value of the blend factor for the partial distribution map corresponding to the assistance region SS, thereby increasing the degree of transparency for the assistance region SS. It is also preferable that the blend factor for the assistance region SS be smaller than the blend factor for the target surface SA. With this, the target surface SA is highlighted relatively with regard to the assistance region SS. The target surface SA and the assistance region SS may be set to different colors from each other and then semi-transparently displayed. As described above, by using different display modes between the range of the target surface SA and the range of the assistance region SS to display, each of the regions can be identified.

Additionally, as in the case of highlighting the target surface SA, the assistance region SS is not limited to being highlighted using semi-transparency and may be highlighted only using a pattern or a frame line. Even in the case of a pattern or a frame line used individually to highlight, in order to highlight the target surface SA relatively with regard to the assistance region SS, a larger diameter of a spot or a larger thickness of a line than that for the assistance region SS is simply used for the target surface SA. Alternatively, different drawing methods for highlighting may be used between the assistance region SS and the target surface SA.

Figure 13:
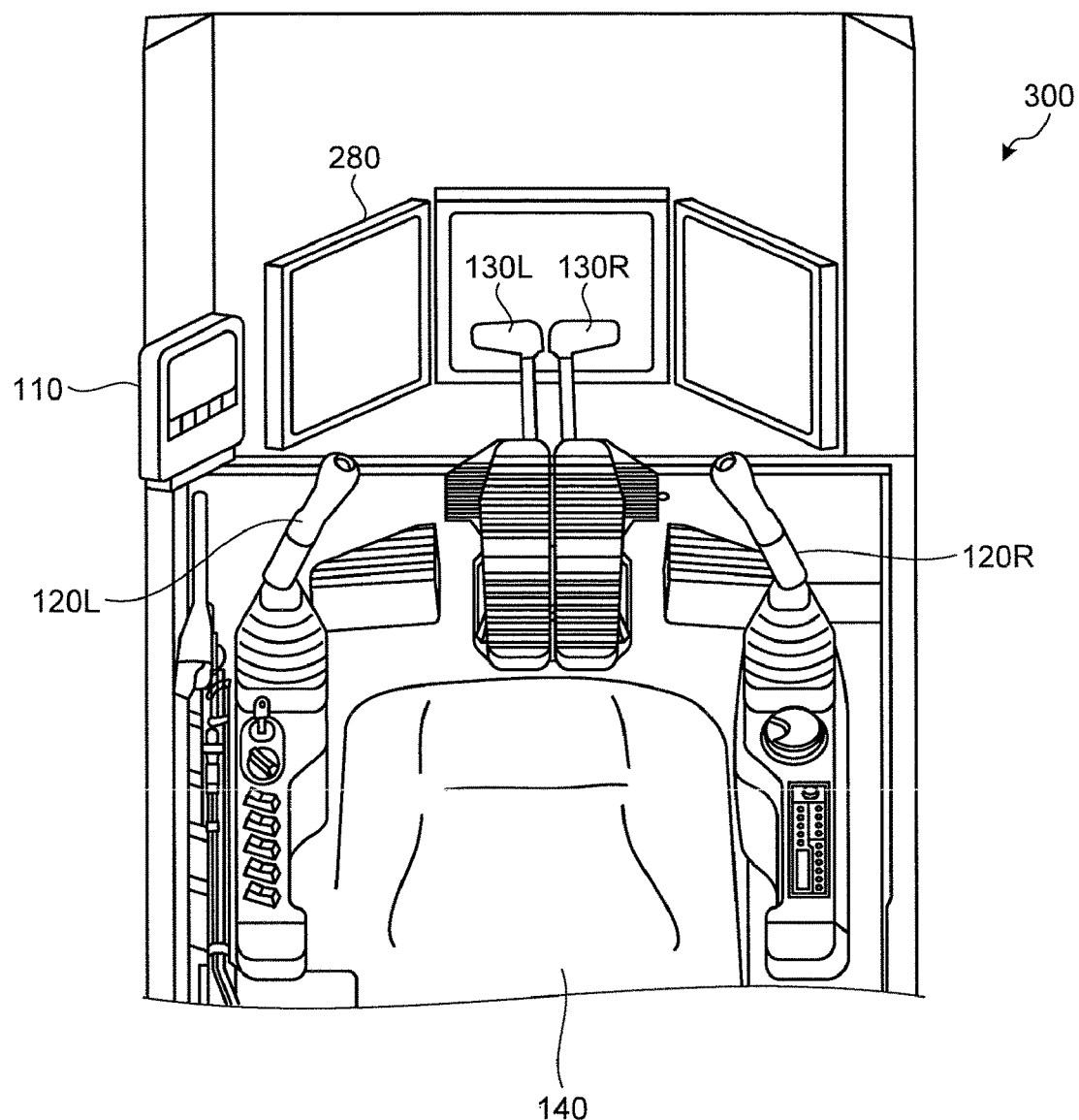
FIG. 13 is a view for explaining a construction information display device in a case where a working machine is remotely operated.

In the embodiment, the construction information display device 28 is equipped in the excavator 100 serving as the working machine. However, the configuration is not limited thereto and, in a case where the working machine such as the excavator 100 is remotely operated from a remote operation room, the construction information display device 28 is provided in the remote operation room. FIG. 13 is a view for explaining a construction information display device 280 in a case where the excavator 100 is remotely operated. The excavator 100 and the remote operation room 300 can wirelessly intercommunicate through a communication device (not illustrated). As illustrated in FIG. 13, a driver's seat 140 is provided in the remote operation room 300 and working instrument operation members 120L and 120R are installed in the vicinity of the driver's seat 140. In addition, traveling operation members 130L and 130R are installed on a front side of the driver's seat 140. By operating the working instrument operation members 120L and 120R, a signal indicating an amount of operation or operation content is transmitted to the excavator 100 such that the working instrument 2 or the upper swing structure 3 can be remotely controlled. By operating the traveling operation members 130L and 130R, a signal indicating an amount of operation or operation content is transmitted to the excavator 100 such that the traveling device 5 can be remotely controlled.

In the remote operation room 300, a monitor device 110 is installed on a diagonally front side when viewed from the driver's seat 140. Data detected by the various types of sensors provided in the excavator 100 is wirelessly transmitted to the remote operation room 300 through the communication device and various types of information is displayed on the monitor device 110 based on that data. Furthermore, a display device including the construction information display device 280 is installed on the front side of the driver's seat 140. The design landform information is stored in a storage device (not illustrated) in the remote operation room 300 in advance and information on the cutting edge position P3 of the bucket 8 is captured from the excavator 100 through the communication device, whereby the distribution map D1 can be generated by a processing device (not illustrated) in the remote operation room 300. In this case, the remote operation room 300 may capture the distribution map D1 generated by the construction management device 90 of the excavator 100 through the communication device to display on the construction information display device 280.

Figure 14:
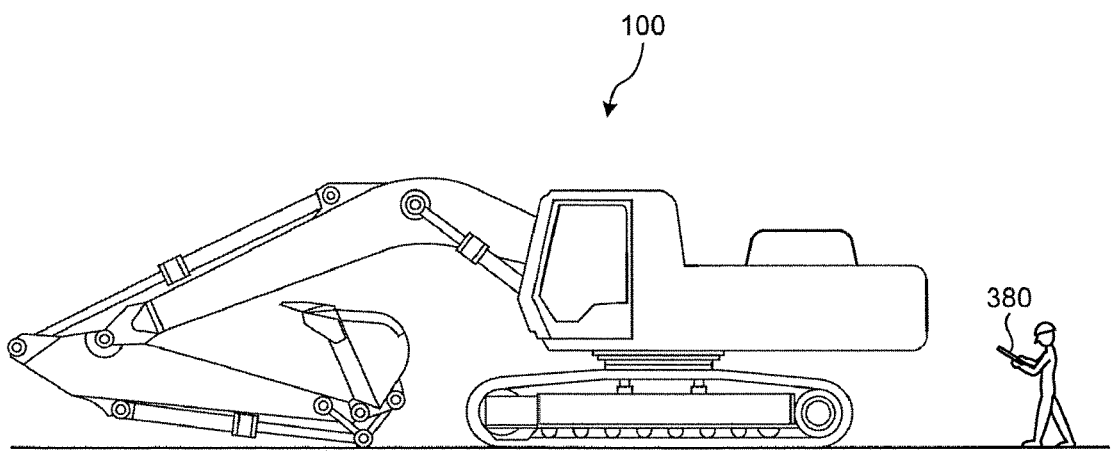
FIG. 14 is a view for explaining an example of the construction information display device in a case where a working machine is remotely operated.

Consequently, as in the case of the aforementioned construction information display device 28 indicated in the embodiment, the construction information display device 280 can display the target surface SA, the partial distribution map, and the like. As illustrated in FIG. 14, instead of the construction information display device 280 installed in the remote operation room 300, a mobile terminal device 380 including at least a display unit may be used as the construction information display device.

REFERENCE SIGNS LIST

1 VEHICLE MAIN BODY
2 WORKING INSTRUMENT
3 UPPER SWING STRUCTURE
4 DRIVING ROOM
5c TRAVEL MOTOR
5 TRAVELING DEVICE
5c HYDRAULIC MOTOR
5a, 5b CRAWLER BELT
8 BUCKET
8B BLADE
8T CUTTING EDGE
9 ATTITUDE DETECTION UNIT
16 FIRST STROKE SENSOR
17 SECOND STROKE SENSOR
18 THIRD STROKE SENSOR
19 POSITION DETECTION UNIT
21, 22 ANTENNA
23 THREE-DIMENSIONAL POSITION SENSOR
24 ANGLE-OF-INCLINATION SENSOR
25 OPERATION DEVICE
26 VEHICLE ELECTRONIC CONTROL DEVICE
27 VEHICLE CONTROL DEVICE
28, 280 CONSTRUCTION INFORMATION DISPLAY DEVICE
35 WORKING INSTRUMENT-SIDE STORAGE UNIT
36 COMPUTING UNIT
37W WORKING CONTROL VALVE
37D TRAVELING CONTROL VALVE
38 DISPLAY INPUT DEVICE
39 DISPLAY CONTROL DEVICE
40A ANTENNA
40 COMMUNICATION UNIT
41 INPUT UNIT
42 DISPLAY UNIT
42a, 42b DISPLAY SCREEN
43 DISPLAY-SIDE STORAGE UNIT
44 DISPLAY PROCESSING UNIT
51, 61 FRAME LINE
70 CORNER PORTION
90 CONSTRUCTION MANAGEMENT DEVICE
91 PROCESSING UNIT
92 STORAGE UNIT
100 EXCAVATOR
300 REMOTE OPERATION ROOM
B1 SCREEN SWITCHING BUTTON
B2 TOP VIEW SWITCHING BUTTON
B3 HIGHLIGHT MODE SELECTION BUTTON
B4 ISOLATION MODE SELECTION BUTTON
B5 SETTING BUTTON
D1 DISTRIBUTION MAP
D2 DESIGN LANDFORM VIEW
P3 CUTTING EDGE POSITION
S0 DESIGN SURFACE
SA TARGET SURFACE
SB CURRENT SURFACE
SS ASSISTANCE REGION

The invention claimed is:

1. A computer aided construction information display device configured to display construction information, comprising:
  a display screen configured to display, in a two-dimensional top view observed from an upper side in a vertical direction, at least
    a design landform including a plurality of design surfaces,
    an image of an excavator observed from the upper side in the vertical direction, and
    a partial distribution map indicating a depth from the design landform to a current landform on the upper side in the vertical direction using colors;
  the display screen having a user interface configured to input one or plurality of target surfaces serving as a region to be constructed selected from the design landform;
  a display processing unit configured to, when the target surface is selected through the user interface, highlight an entire range of the selected target surface while visibly displaying the partial distribution map within the selected target surface by semi-transparently displaying the selected target surface.

2. The computer aided construction information display device according to claim 1, wherein the display processing unit displays the range of the target surface by applying a predetermined pattern to the inside of the selected target surface and visibly displays the partial distribution map.

3. The computer aided construction information display device according to claim 2, wherein the display control unit displays the range of the target surface by using a frame line of the selected target surface.

4. The computer aided construction information display device according to claim 1, wherein the display processing unit displays the range of the target surface by using a frame line of the selected target surface.

5. The computer aided construction information display device according to claim 1, further comprising a setting unit configured to set an assistance region that assists construction for the selected target surface so as to be displayed around the target surface, wherein
in a case where the assistance region is set, by the setting unit, to be displayed on the display screen together with the target surface, the display processing unit displays a range of the assistance region in addition to the range of the selected target surface and visibly displays the partial distribution map within the assistance region.

6. The computer aided construction information display device according to claim 5, wherein the display processing unit semi-transparently displays the selected target surface and the assistance region.

7. The computer aided construction information display device according to claim 6, wherein the range of the target surface and the range of the assistance region are displayed using different display modes from each other.

8. The computer aided construction information display device according to claim 5, wherein the range of the target surface and the range of the assistance region are displayed using different display modes from each other.

9. The computer aided construction information display device according to claim 1, wherein the display control unit displays the range of the target surface by using a frame line of the selected target surface.

10. The computer aided construction information display device according to claim 1, wherein the colors displayed on the partial distribution map are configured to vary according to a depth from the design landform to a current landform.

11. The computer aided construction information display device according to claim 10, wherein the colors displayed on the partial distribution map are configured to gradually change as a depth from the design landform to a current landform becomes larger.

12. The computer aided construction information display device according to claim 10, wherein the colors displayed on the partial distribution map are configured to change according to a predetermined color order as a depth from the design landform to a current landform becomes larger.

13. A method for displaying construction information configured to display construction information, comprising:
displaying on a display screen, in a two-dimensional top view observed from an upper side in a vertical direction, at least:
a design landform including a plurality of design surfaces,
an image of an excavator observed from the upper side in the vertical direction, and
a partial distribution map indicating a depth from the design landform to a current landform on the upper side in the vertical direction using colors;
highlighting, when a target surface is selected, as a user input from an interface, from the design landform, an entire range of the selected target surface while visibly displaying the partial distribution map within the selected target surface by semi-transparently displaying the selected target surface.

* * * * *